(12) United States Patent
Zhang et al.

(10) Patent No.: US 8,540,205 B2
(45) Date of Patent: Sep. 24, 2013

(54) ELECTRONIC DEVICE HAVING ADJUSTABLE TABLE STAND

(75) Inventors: Shi-Pei Zhang, Shenzhen (CN); Man-Zhong Wang, Shenzhen (CN); Te-Hua Lee, Tu-Cheng (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 573 days.

(21) Appl. No.: 12/769,679

(22) Filed: Apr. 29, 2010

(65) Prior Publication Data

US 2011/0036965 A1 Feb. 17, 2011

(30) Foreign Application Priority Data

Aug. 14, 2009 (CN) .......................... 2009 1 0305624

(51) Int. Cl.
*A47G 29/00* (2006.01)
*F16M 11/00* (2006.01)

(52) U.S. Cl.
USPC ........... 248/688; 248/686; 248/917; 248/922; 248/923

(58) Field of Classification Search
USPC ................. 248/688, 686, 685, 460, 454, 393, 248/917, 923
See application file for complete search history.

(56) References Cited

U.S. PATENT DOCUMENTS

| | | | | |
|---|---|---|---|---|
| 3,831,989 | A * | 8/1974 | Gurzenda | 292/338 |
| 5,135,273 | A * | 8/1992 | MacCalder | 292/338 |
| 6,085,388 | A * | 7/2000 | Kaneko | 16/338 |
| 6,311,941 | B1 * | 11/2001 | Feldmeyer | 248/188.8 |
| 6,517,040 | B1 * | 2/2003 | Wen | 248/278.1 |
| 6,899,311 | B1 * | 5/2005 | Ternus | 248/454 |
| 7,594,638 | B2 * | 9/2009 | Chan et al. | 248/677 |
| 7,735,797 | B2 * | 6/2010 | Hu | 248/371 |
| 8,074,956 | B2 * | 12/2011 | Wang et al. | 248/688 |
| 8,276,240 | B2 * | 10/2012 | Ritachka | 16/83 |
| 2009/0304377 | A1 | 12/2009 | Chang et al. | |
| 2010/0133414 | A1 * | 6/2010 | Lee et al. | 248/686 |
| 2010/0171671 | A1 * | 7/2010 | Park | 343/720 |

FOREIGN PATENT DOCUMENTS

| | | |
|---|---|---|
| TW | M350193 U | 2/2009 |
| TW | M351388 U | 2/2009 |

* cited by examiner

*Primary Examiner* — Amy J Sterling
(74) *Attorney, Agent, or Firm* — Altis & Wispro Law Group, Inc.

(57) ABSTRACT

An electronic device includes a main body and a table stand connected to the main body for supporting the main body. The main body comprises a positioning member. The table stand defines at least two positioning holes. The table stand is operable to rotate relative to the main body. The positioning member is operable to be selectively inserted into either one of the at least two positioning holes, such that the table stand is operable to form a corresponding predetermined angle with the main body.

16 Claims, 6 Drawing Sheets

ELECTRONIC DEVICE HAVING ADJUSTABLE TABLE STAND

BACKGROUND

1. Technical Field

The present disclosure relates to electronic devices, and particularly to an electronic device with a table stand which is adjustable to select a desirable viewing angle.

2. Description of Related Art

Some electronic devices are equipped with a support such as a table stand that swivels out from the device to support the device on a tabletop. However, most current table stands are not adjustable or not easily adjustable. That is, the table stand folds out at a predetermined angle with the electronic device. As a result, the viewing angle for different users cannot be adjusted.

Therefore, it is desirable to provide an electronic device having an adjustable table stand which can overcome the above-mentioned problems.

BRIEF DESCRIPTION OF THE FIGURE

The components of the drawings are not necessarily drawn to scale, the emphasis instead being placed upon clearly illustrating the principles of the embodiment of an electronic device having an adjustable table stand. Moreover, in the drawings, like reference numerals designate corresponding parts throughout several views.

DETAILED DESCRIPTION

Embodiments of the present disclosure will now be described in detail with reference to the drawings.

Figure 1:
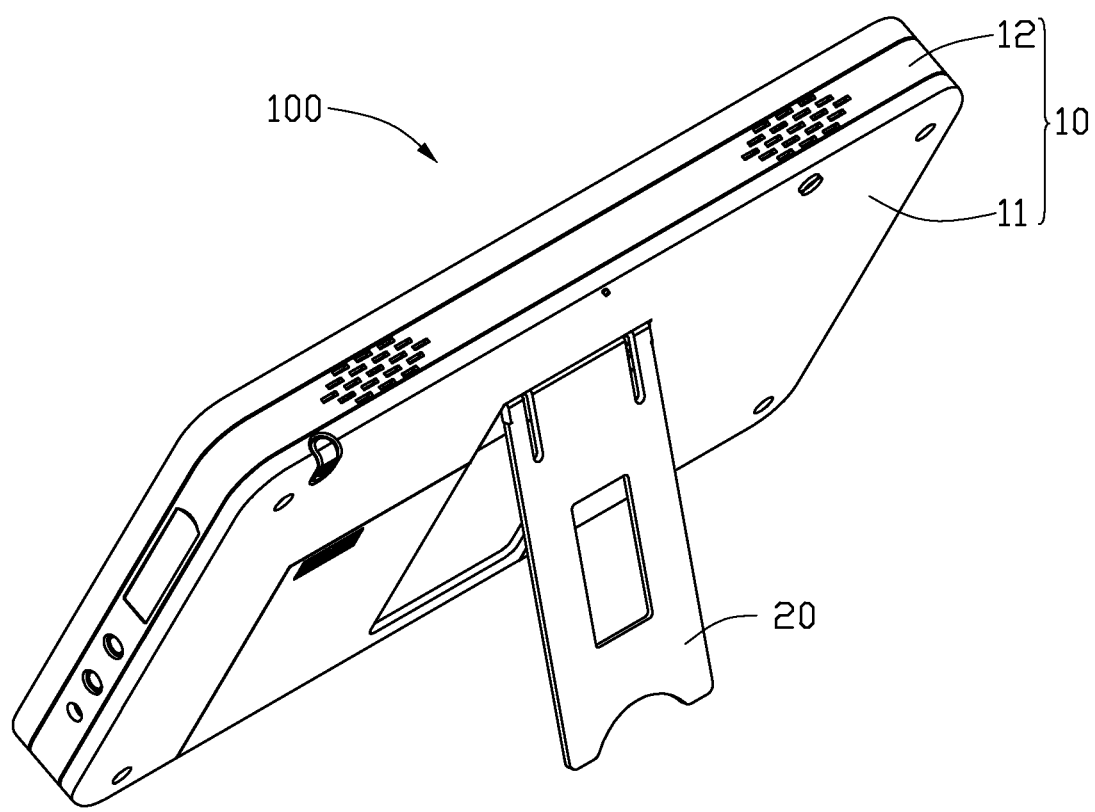
FIG. 1 is an assembled, isometric, schematic view of an electronic device having an adjustable table stand in a first state, according to an exemplary embodiment.

Referring to FIG. 1, a device 100 includes a main body 10 and a table stand 20 rotatably connected to the main body 10. The main body 10 includes a front body 12 and a rear cover 11 covering the back of the front body 12. In this embodiment, the device 100 is a digital photo frame.

Figure 2:
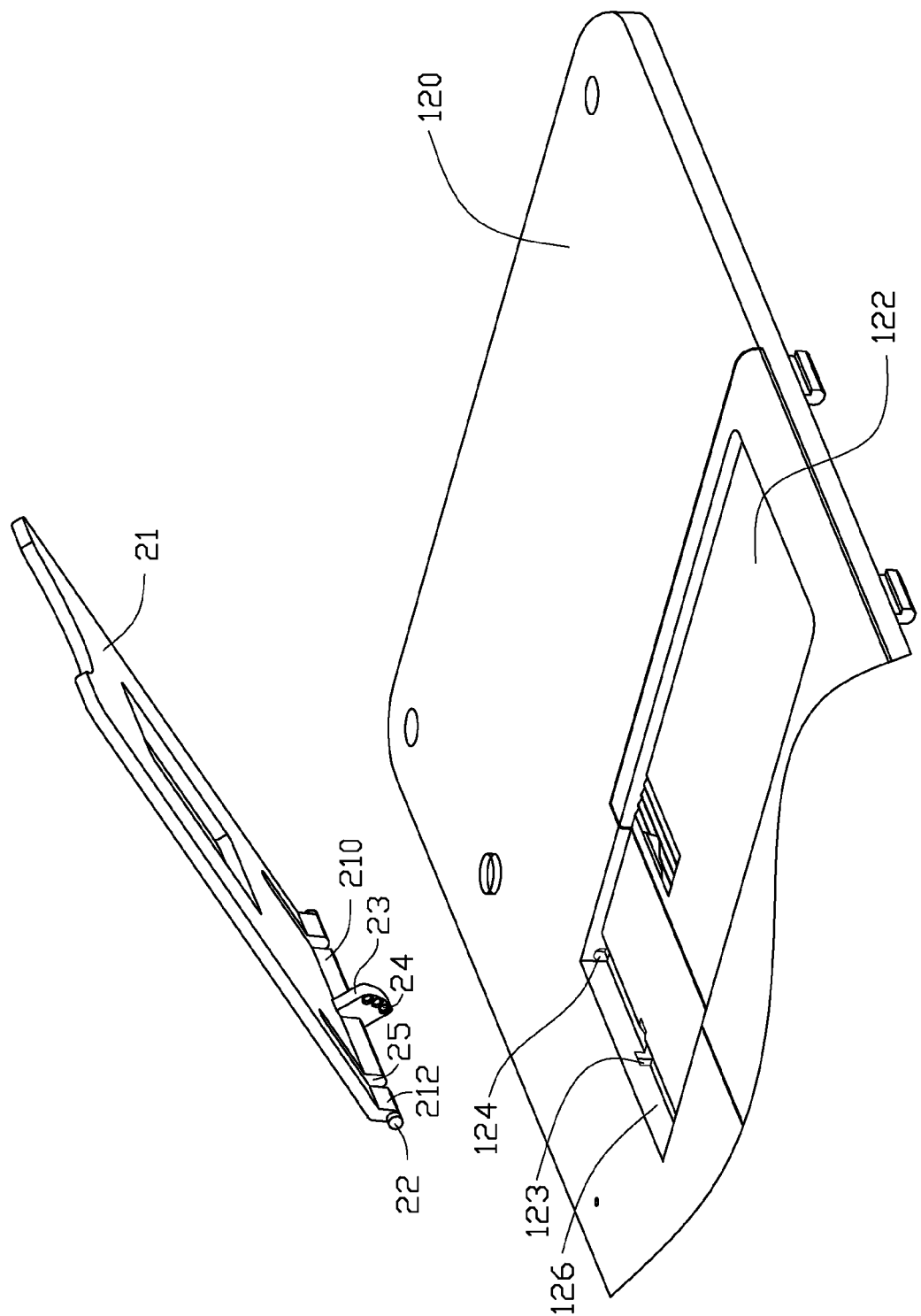
FIG. 2 is a partially exploded view of the electronic device of FIG. 1.
Figure 3:
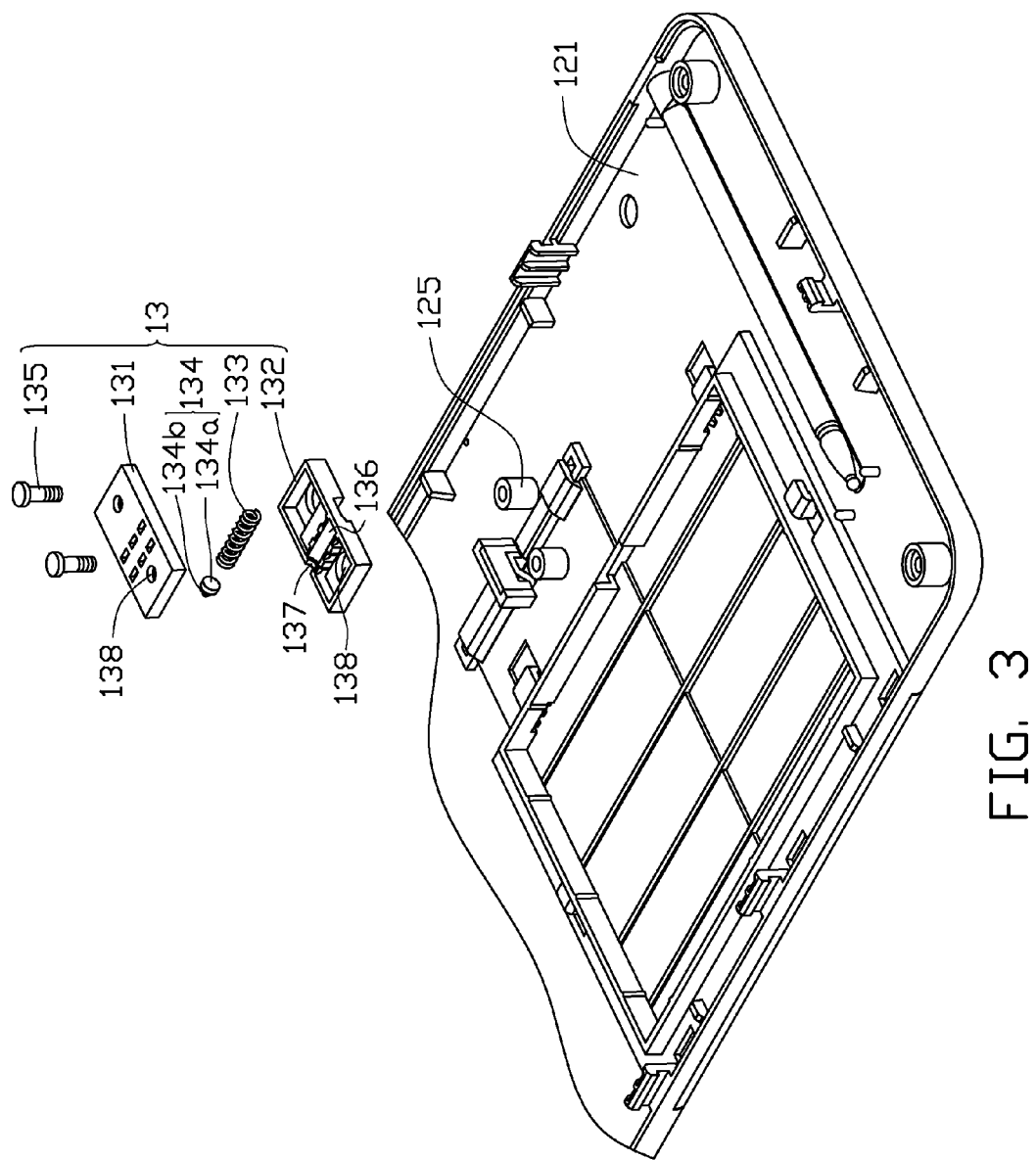
FIG. 3 is another partially exploded view of the electronic device of FIG. 1.
Figure 4:
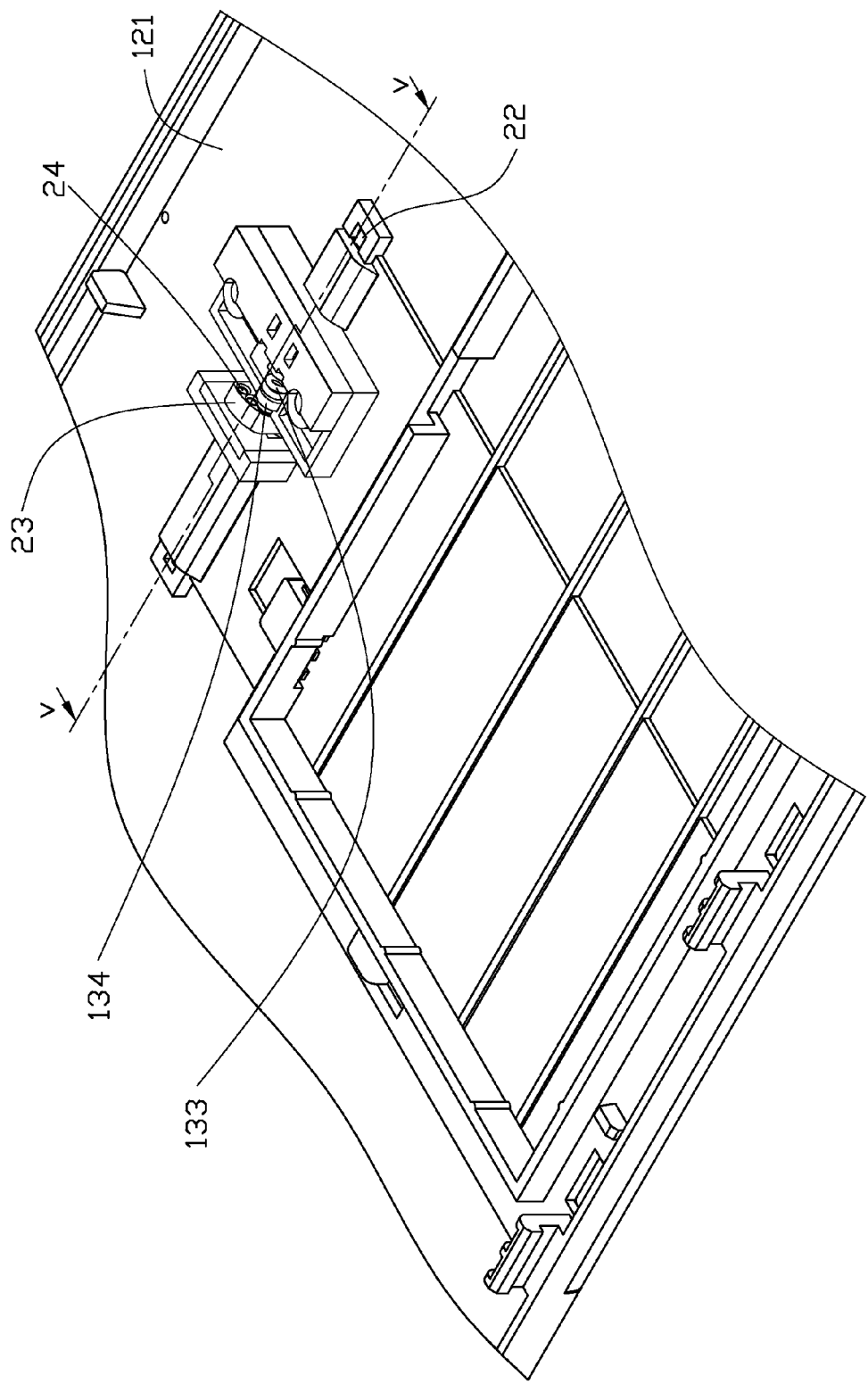
FIG. 4 is a partial cut away view of the electronic device of FIG. 1.

Referring to FIGS. 2-4, the rear cover 11 includes an outer surface 120 and an inner surface 121. The inner surface 121 faces the front body 12, while the outer surface 120 faces away from the front body 12. The rear cover 11 defines a rectangular space 122 and a groove 126 communicating with the space 122. The rear cover 11 further defines an opening 123 through the outer surface 120 and the inner surface 121 and a pair of pivot holes 124 communicating with the groove 126. The pivot holes 124 are coaxially positioned at two opposite sides of the opening 123. The opening 123 is positioned between the pair of pivot holes 124. The rear cover 11 further includes two fixing columns 125 protruding from the inner surface 121 and adjacent to the opening 123. Each of the fixing columns 125 defines a screw hole (not labeled).

The main body 10 further includes a fixing mechanism 13 positioned on the inner surface 121 of the rear cover 11. The fixing mechanism 13 includes a bottom cover 132, a top cover 131, an elastic member 133, a positioning member 134, and two screws 135. Each of the top cover 131 and the bottom cover 132 defines two through holes 138. The top cover 131 and the bottom cover 132 are sleeved on the fixing columns 125 via the through holes 138. The screws 135 are screwed into the fixing columns 125 to fix the top cover 131 and the bottom cover 132 on the inner surface 121.

The top cover 131 and the bottom cover 132 further jointly define a first hole 136 and a second hole 137. The second hole 137 communicates with the first hole 136 and faces the opening 123. The elastic member 133 is received in the first hole 136. The positioning member 134 includes a first portion 134a and a second portion 134b formed on the first portion 134a. The first portion 134a is received in the first hole 136 adjacent to the second hole 137 and resists the elastic member 133. Accordingly, the elastic member 133 applies an elastic repelling force to the positioning member 134. The second portion 134b is inserted through the second hole 136 and protrudes outward from the top cover 131 and the bottom cover 132.

The table stand 20 includes a supporting plate 21, two shafts 22, and a positioning plate 23. The supporting plate 21 is a substantially rectangular plate having a bent end 210. The two shafts 22 extend coaxially from two opposite sides of the bent end 210 respectively. The positioning plate 23 protrudes upward from the bent end 210 and defines a plurality of positioning holes 24. The plurality of positioning holes 24 are substantially aligned in an arc. The table stand 20 further defines two slots 25 in the bent end 210 at opposite sides of the positioning plate 23, such that two bendable portions 212 are formed adjacent to the two slots 25 correspondingly. The two bendable portions 212 can be flexibly pressed toward the positioning plate 23.

Figure 5:
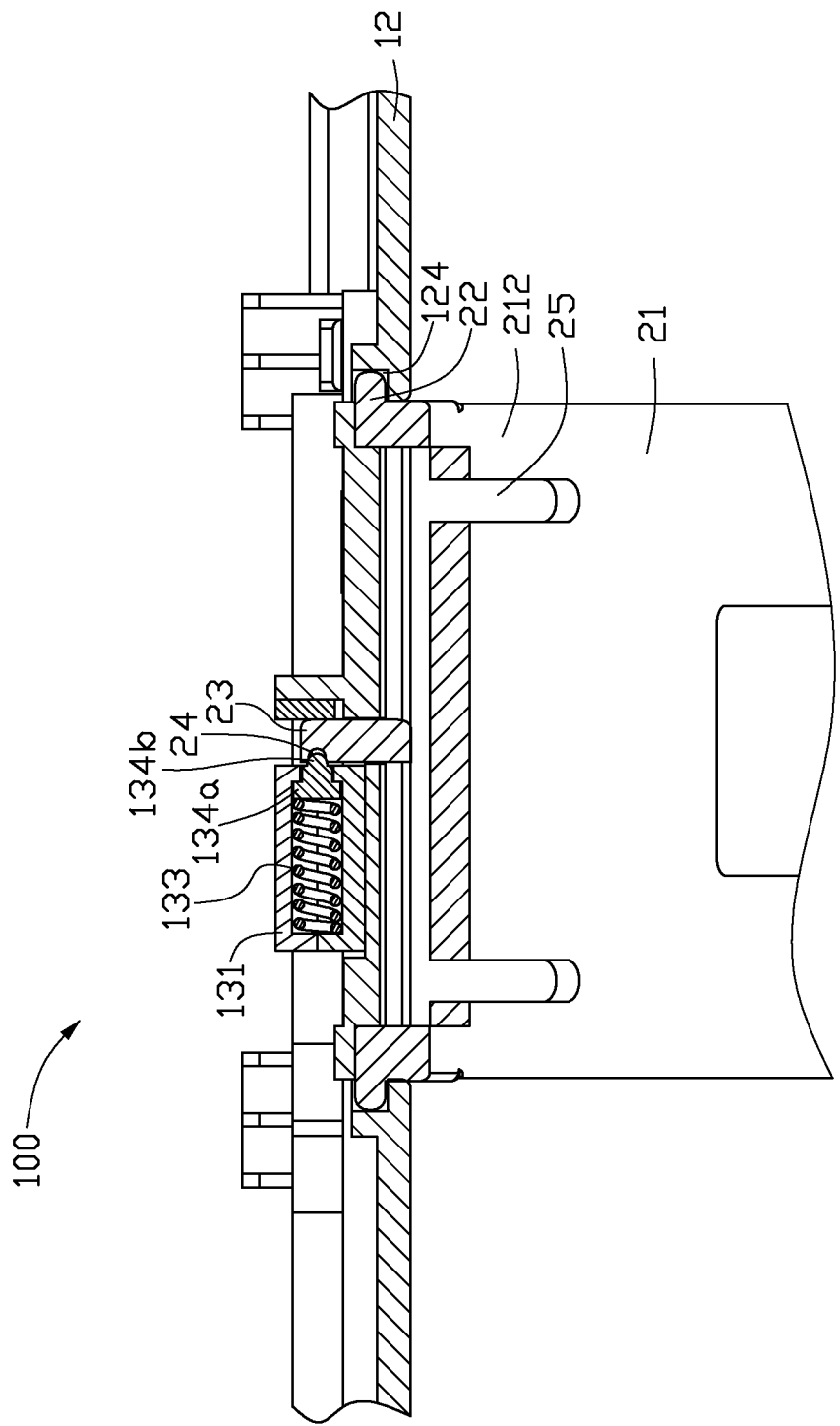
FIG. 5 is a partial cross-sectional view of the electronic device, taken along V-V line of FIG. 4.

Further referring to FIG. 5, the two bendable portions 212 are pressed toward the positioning plate 23, such that the two shafts 22 move toward the positioning plate 23. Then, the positioning plate 23 is inserted through the opening 123, and the bent end 210 is received in the groove 126. Finally, the two bendable portions 212 are released, such that the two shafts 22 are pivotably inserted into the two pivot holes 124. As such, the table stand 20 is assembled to the main body 10.

Figure 6:
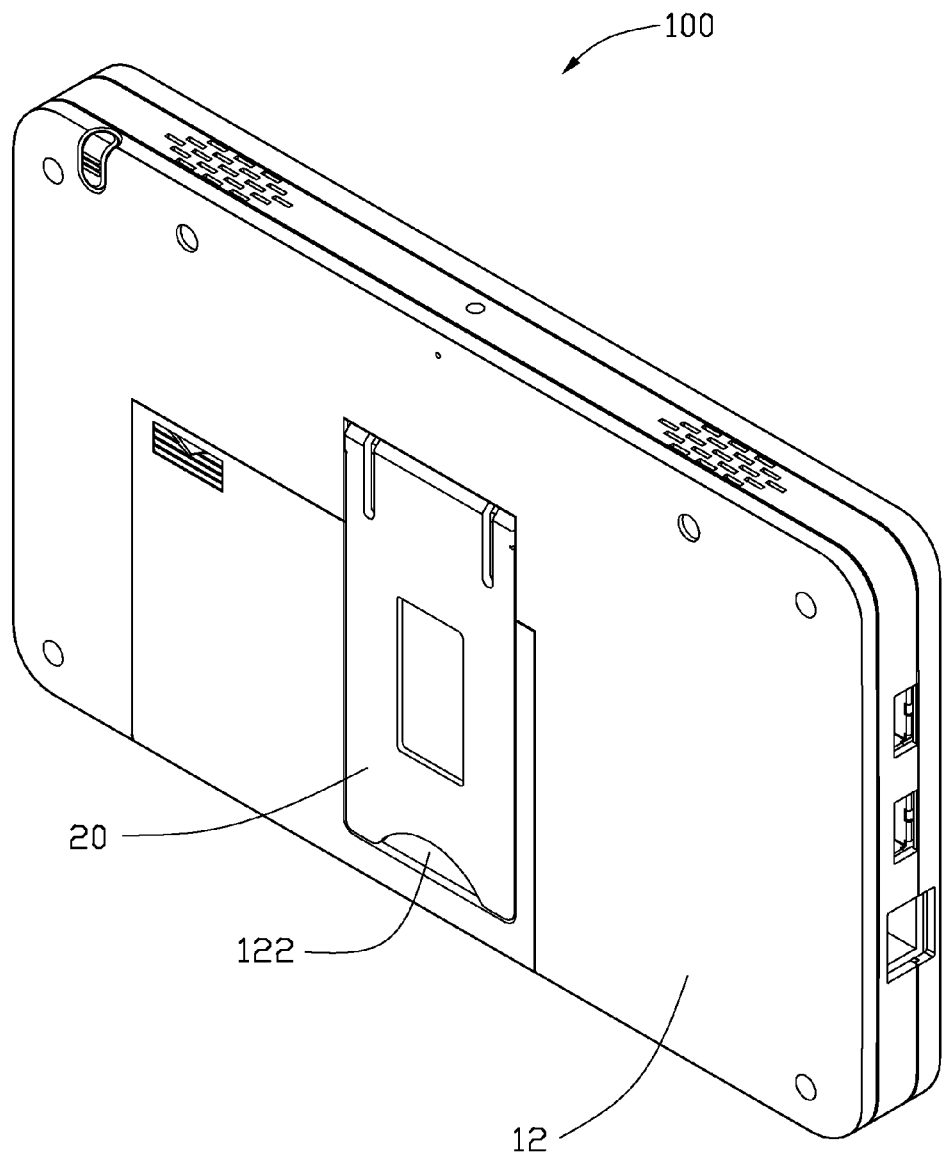
FIG. 6 is an assembled, isometric, schematic view of the electronic device of FIG. 1 in a second state.

To provide support for the main body 10, the table stand 20 is rotated relative to the main body 10 to a support position. If the second portion 134b is aligned with one of the positioning holes 24, the second portion 134b is inserted into the aligned positioning hole 24 due to the repelling force of the elastic member 133. As such, the table stand 20 is fixed and forms a predetermined angle with respect to the main body 10. Otherwise, the second portion 134b is resisted by the positioning plate 23 and received in the second hole 137. The angle between the table stand 20 and the main body 10 can be adjusted via fixing the table stand 20 at different positions corresponding to the plurality of positioning holes 24. Thereby, the main body 10 can be placed at an appropriate viewing angle for a user. Referring to FIG. 6, the table stand 20 can be rotated to be received in the space 122 if the main body 10 does not need to be supported.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. An electronic device, comprising:
   a main body comprising:
      a front body;
      a rear cover combining with the front body;
      an elastic member positioned between the rear cover and the front body;
      a positioning member being positioned between the front body and the rear cover, and the positioning member resisting the elastic member;
      an opening defined in the rear cover; and
   a table stand rotatably connected to the main body for supporting the main body, the table stand comprising a supporting plate and a positioning plate disposed on the supporting plate, the supporting plate being operable to support the main body, the positioning plate defining at least two position holes, the positioning plate being rotatably inserted through the opening so as to enable the position member to be inserted into either one of the at least two positioning holes to fix the table stand under the elastic force of the elastic member, the main body defines a pair of pivot holes, the table stand comprises two shafts formed on one end of the supporting plate, the two shafts are respectively inserted into the pair of pivot holes, such that the supporting plate is operable to rotate relative to the main body, the supporting plate defines at least one slot from the end of the supporting plate where the two shafts are formed, such that at least one of the two shafts is operable to move toward the positioning plate.

2. The electronic device of claim 1, wherein the main body defines a space therein, the supporting plate is operable to be received in the space.

3. The electronic device of claim 1, wherein the main body comprises a fixing mechanism, the fixing mechanism comprises the elastic member and the positioning member, the fixing mechanism further comprises a top cover and a bottom cover, the top cover and the bottom cover jointly defines a first hole and a second hole communicating with the first hole, the elastic member is received in the first hole, the positioning member comprises a first portion and a second portion formed on the first portion, the first portion is received in the first hole and resists the elastic member, the second portion protrudes from the second hole and resists the positioning plate.

4. The electronic device of claim 1, wherein the at least two positioning holes are substantially aligned in an arc.

5. An electronic device, comprising:
   a main body; and
   a table stand connected to the main body for supporting the main body;
   wherein the main body comprises a positioning member, the table stand defines at least two positioning holes, the table stand is operable to rotate relative to the main body, the positioning member is operable to be selectively inserted into either one of the at least two positioning holes, such that the table stand is operable to form a corresponding predetermined angle with the main body, the table stand forces the positioning member to disengage from the positioning holes during rotating, the main body comprises a fixing mechanism, the fixing mechanism comprises an elastic member and the positioning member, the fixing mechanism further comprises a top cover and a bottom cover, the top cover and the bottom cover defines a first hole and a second hole communicating with the first hole, the elastic member is received in the first hole, the positioning member comprises a first portion and a second portion connected to the first portion, the first portion is received in the first hole and resists the elastic member, the second portion protrudes from the second hole and resists the table stand.

6. The electronic device of claim 5, wherein the main body defines an opening, the table stand comprises a supporting plate and a positioning plate extending from the supporting plate, the supporting plate is adapted to support the main body, the positioning plate is rotatably inserted through the opening and faces the positioning member, the at least two positioning holes are defined in the positioning plate.

7. The electronic device of claim 6, wherein the main body defines a pair of pivot holes, the table stand comprises two shafts formed on one end of the supporting plate, the two shafts are respectively inserted into the pair of pivot holes, such that the supporting plate is operable to rotate relative to the main body.

8. The electronic device of claim 7, wherein the at least one slot from the end of the supporting plate where the two shafts are formed.

9. The electronic device of claim 7, wherein the main body defines a space therein, the supporting plate is operable to be received in the space.

10. The electronic device of claim 5, wherein the main body comprises a front body and a rear cover covering a back of the front body, the table stand is rotatably connected to the rear cover.

11. The electronic device of claim 5, wherein the at least two positioning holes are substantially aligned in an arc.

12. The electronic device of claim 1, wherein the at least two positioning holes face at least one of the two shafts.

13. An electronic device, comprising:
    a main body comprising a position member; and
    a table stand connected to the main body for supporting the main body; the table stand comprising:
       a supporting plate being operable to support the main body;
       a positioning plate disposed on the supporting plate, the positioning plate defining at least two positioning holes; and
       two shafts extending from two opposite sides of the supporting plate and rotatably connected to the main body;
       wherein the supporting plate defines at least one slot to enable one of the two shafts operable to move toward the positioning plate, the positioning member is operable to be selectively inserted into either one of the at least two positioning holes, such that the table stand forms a corresponding predetermined angle with the main body, the table stand forces the positioning member to disengage from the positioning holes during rotating.

14. The electronic device of claim 13, wherein the supporting plate comprise a bent end, the shafts are form on the bent end, the at least one slot is defined in the bend end.

15. The electronic device of claim 12, wherein the at least two positioning holes face at least one of the two shafts.

16. The electronic device of claim 12, wherein the main body further comprising a front body and a rear cover, the position member is received between front body and the rear cover, the rear cover defines an opening, the positioning plate is rotatably inserted through the opening and faces the positioning member.

* * * * *